United States Patent [19]

Lee

[11] Patent Number: 5,291,301
[45] Date of Patent: Mar. 1, 1994

[54] RESERVED RECORDING METHOD AND APPARATUS FOR GROUPING PROGRAMS BASED ON CONTENT

[75] Inventor: Dong-gil Lee, Kyunggi, Rep. of Korea

[73] Assignee: Samsung Electronics Co., Ltd., Kyunggi, Rep. of Korea

[21] Appl. No.: 910,396

[22] Filed: Jul. 8, 1992

[30] Foreign Application Priority Data

Jul. 8, 1991 [KR] Rep. of Korea .................. 91-11514

[51] Int. Cl.$^5$ ............................................. H04N 5/76
[52] U.S. Cl. .................... 358/335; 360/14.1; 360/33.1; 360/69; 360/72.1; 360/74.1; 358/311
[58] Field of Search ................ 358/335, 310, 311; 360/5, 13, 14.1, 33.1, 69, 71, 72.1, 72.2, 74.1, 74.4; H04N 5/76, 9/79

[56] References Cited

U.S. PATENT DOCUMENTS

| | | | |
|---|---|---|---|
| 4,325,081 | 4/1982 | Abe et al. | 455/181.1 |
| 4,706,121 | 11/1987 | Young | 358/142 |
| 4,963,994 | 10/1990 | Levine | 358/335 |
| 5,050,009 | 9/1991 | Takahashi et al. | 358/906 |

*Primary Examiner*—Tommy P. Chin
*Assistant Examiner*—Khoi Truong

*Attorney, Agent, or Firm*—Sughrue, Mion, Zinn, Macpeak & Seas

[57] ABSTRACT

A reserved recording method and apparatus performs reserved recording based upon the contents of programs. When program information is reserved, a block number denoting the class of the program is stored in a memory. Then, after receiving current time information through a timer, when the current time is the pre-programmed recording time, the initial program is recorded and the existence of program information having the same block number is checked. If a program of the same block number exists, the pre-programmed time of this program is compared with those of programs having other block numbers, so that a fast-forward operation is performed for as long as the predetermined tape length of the program of the same block number when a program of another block number is earlier. Then, a program of another block number is recorded at the corresponding pre-programmed time. Also, if the program of another block number is already recorded at the current position on the tape, a rewind operation is performed to the corresponding position, thereby recording the program at the corresponding pre-programmed time. Since the locations of respective programs recorded on the tape are linked based upon the content thereof, the recorded programs having a desired content can be easily selected for viewing during playback.

11 Claims, 6 Drawing Sheets

RESERVED RECORDING METHOD AND APPARATUS FOR GROUPING PROGRAMS BASED ON CONTENT

BACKGROUND OF THE INVENTION

The present invention relates to a reserved recording method and apparatus in a video recording/reproducing apparatus capable of performing reserved recording of programs which are grouped on the recording medium according to their contents, regardless of the pre-programmed time of the program.

Conventional video cassette recorders (VCRs) are constructed as illustrated in FIG. 1. In the VCR illustrated in FIG. 1, a signal processor 60 has recording and playback sections, a servo system 40 has a capstan servo and drum servo. Also, a deck 50 includes a mechanism for moving the tape and positioning various heads. In operation, the recording section of signal processor 60 first separates a received image signal into a luma signal and a chroma signal. In order to record these signals directly on the tape, the luma signal is frequency modulated, and the chroma signal is converted to a frequency band which is below that of the luma signal. Then, the two signals are synthesized, and the synthesized signal is recorded on the tape through a video head of deck 50.

In the operation of the playback section of signal processor 60, the luma signal band of the video signal reproduced through the video head of deck 50 is FM-demodulated. After filtering the signal, corresponding to the chroma signal, whose band is below the luma signal band, up-conversion is carried out to the frequency band of the original chroma signal. Thus, the two signals are synthesized, and then output on the screen or display 70.

Deck 50 is provided with a full-track erasing head, video heads, an audio head, a control head, etc. Here, two video heads are installed on the drum to have a phase difference of 180°. In addition, a drum motor for driving the drum and a capstan motor ? or controlling the travel of the tape are provided.

Accordingly, servo system 40 includes the drum servo for controlling the rotation of the drum of deck 50, and the capstan servo for controlling the travelling speed of the tape in accordance with the recording operational mode command for recording programs which are pre-programmed in controller 20. Here, the rotational frequency of the drum motor is 30Hz, while that of the capstan motor is 1078.92Hz in a standard mode and 359.64Hz (1078.92Hz/3) in an extended mode.

When reserved recording functions are intended to be carried out in the above-described conventional VCR system, they are recorded according to the sequence of starting times which are input to the VCR, i.e., in the order of their broadcasting time. In particular, if six programs PG1-PG6 are to be recorded, as shown in FIG. 2, the recording is sequentially executed at the corresponding time according to the order in which they will be received, i.e., from PG1, PG2, PG3, PG4, PG5, to PG6. Here, assuming that programs PG1 and PG4 are sports programs, PG2 and PG5 are drama programs, and PG3 and PG6 are news, pre-programmed programs PG1 G6 are sequentially recorded in accordance with the order of reception in the conventional method.

Therefore, after completing the recording, when a viewer desires to view specific programs with subject-related contents successively, since these programs have not been recorded according to classification, the viewer must search every program by pressing a VISS (Video Index Search System) or VASS (Video Address Search System) button on the VCR, or via a remote control, both of which correspond to input unit 10. In other words, when the viewer wants to watch specific programs having related subject matter after recording a plurality of programs on a conventional device, the viewer must hunt through all the recorded programs to find the specific programs, using the VISS or VASS function in a high-speed mode such a fast-forward (FF) or rewind (REW).

SUMMARY OF THE INVENTION

The present invention is devised to solve the above-described problem. Accordingly, it is an object of the present invention to provide a reserved recording method in a video recording/reproducing apparatus, wherein a plurality of pre-programmed programs can be recorded and identified based upon the subject matter or content thereof.

It is another object of the present invention to provide a reserved recording method in a video recording-/reproducing apparatus, wherein pre-programmed programs are classified according to their subject matter and recorded on a section of the recording medium corresponding to the subject matter.

To achieve the objects of the present invention, there is provided a reserved recording method and apparatus in a video recording/reproducing apparatus having a reservation function. Programs are recorded using this reservation function, and are associated with various groups in accordance with their subject matter. For this operation, when program information is reserved, a block number which designates the class of the program and a pre-programmed time are stored in a memory. Then, after receiving current time information through a timer, when the current time corresponds to the pre-programmed recording time, the initial program is recorded and the existence of program information having the same block number is checked. At this time, if a program having the same block number exists, the pre-programmed time of this program is compared with those of the programs having other block numbers, so that the FF function is performed for a time period corresponding to the predetermined tape amount of the program in the same block when a program of another block has an earlier pre-programmed time. Accordingly, space is reserved on the recording medium for recording the program having the same block number. Thereafter, the program of another block number is recorded at the corresponding pre-programmed time. Also, if the program of another block number is already recorded on the current position of the tape, the REW function is performed for a time period corresponding to the length of the recording medium required to return to the reserved portion, thereby recording the program at the corresponding pre-programmed time. By doing so, the program is recorded at the pre-programmed rime, meanwhile the locations of respective programs on the tape are set according to their subject matter.

BRIEF DESCRIPTION OF THE DRAWINGS

The objects and features of the present invention will become more readily apparent from the following detailed description of the preferred embodiments taken in conjunction with the accompanying drawings, in which.

DETAILED DESCRIPTION OF THE PREFERRED EMBODIMENT

Figure 3:
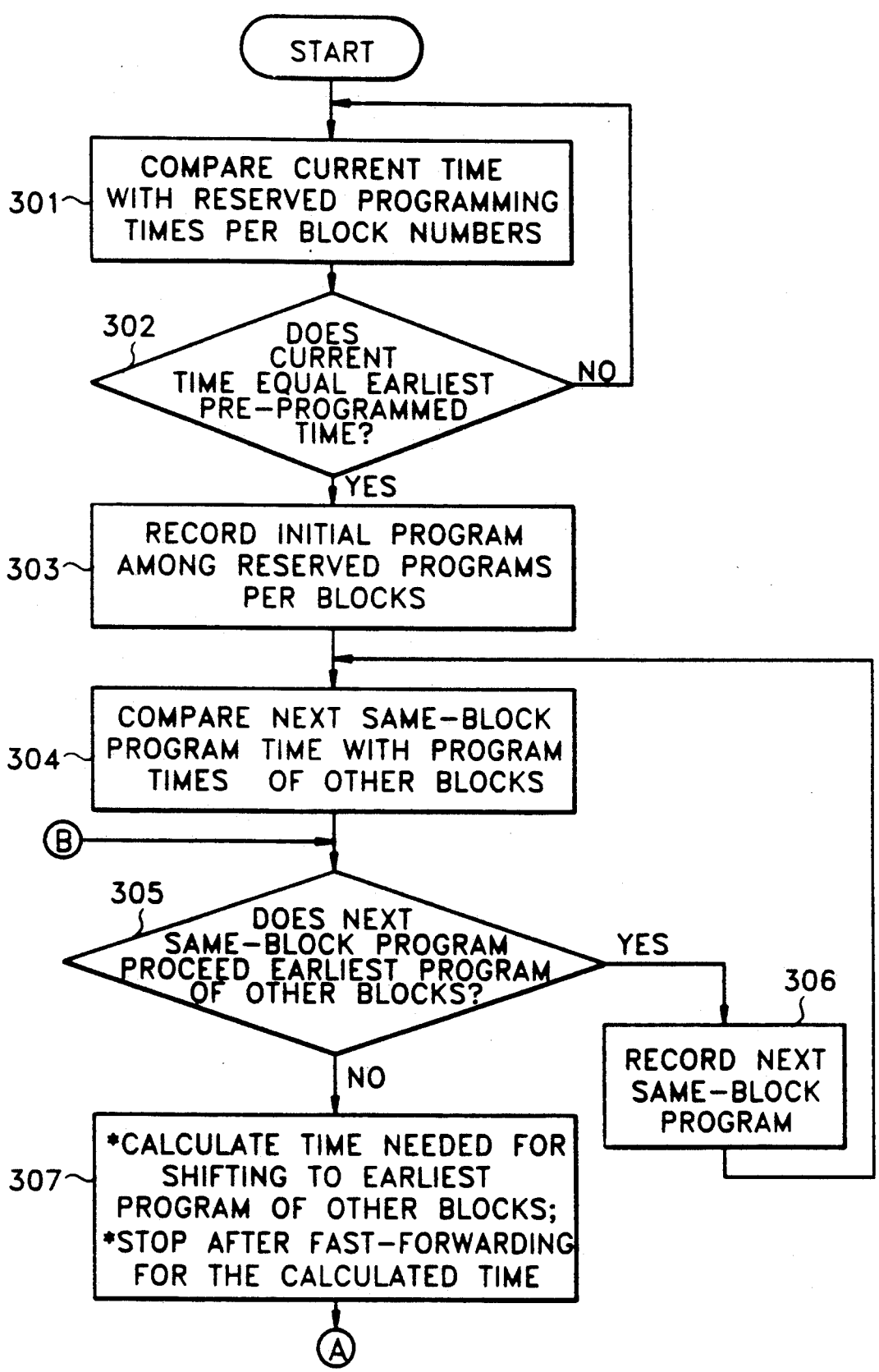
FIG. 3 is a flowchart showing a reserved recording method according to a preferred embodiment of the present invention.
Figure 3:
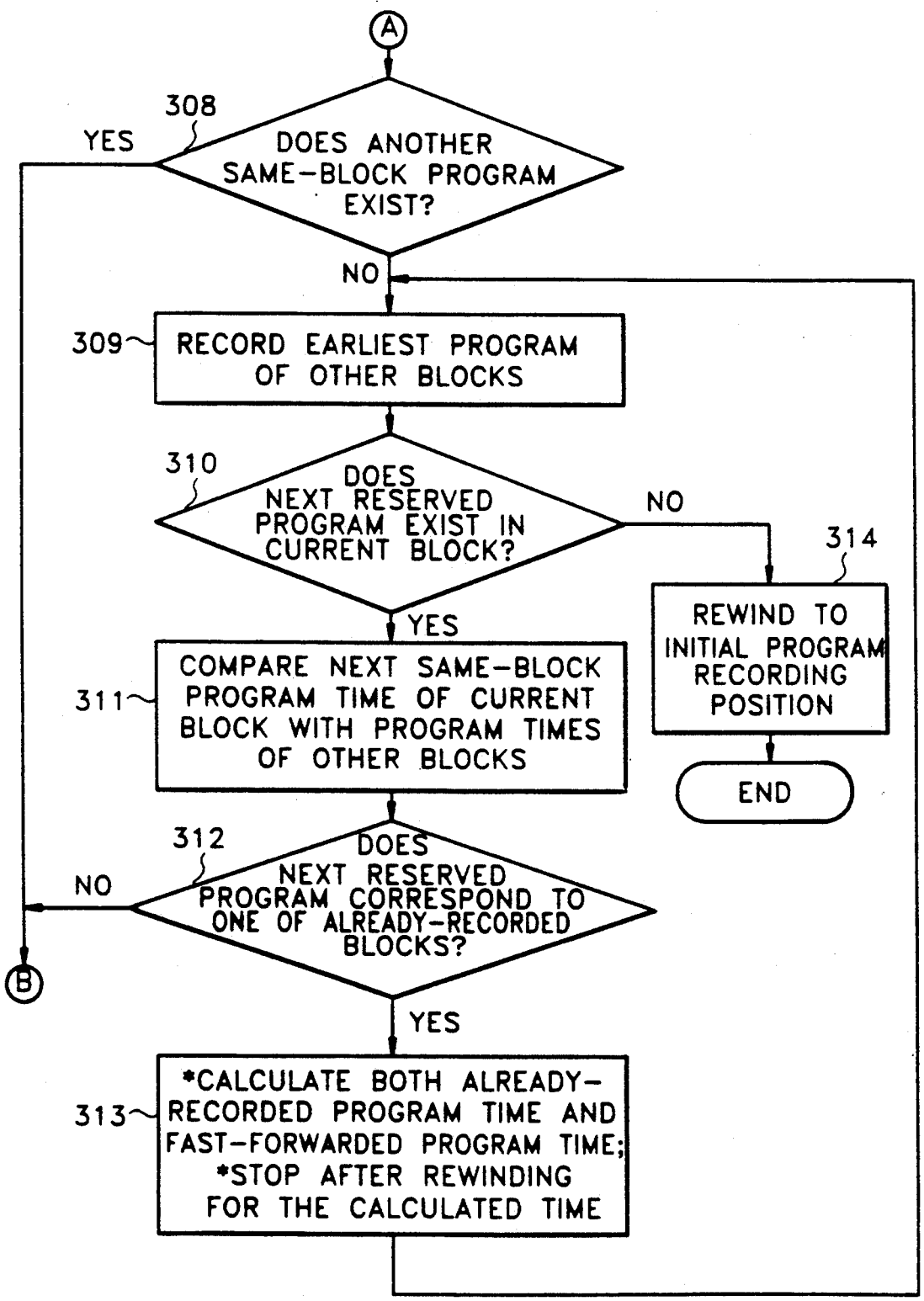

Hereinafter, the preferred embodiments of the present invention will be described in detail with reference to FIGS. 3-5.

Figure 1:
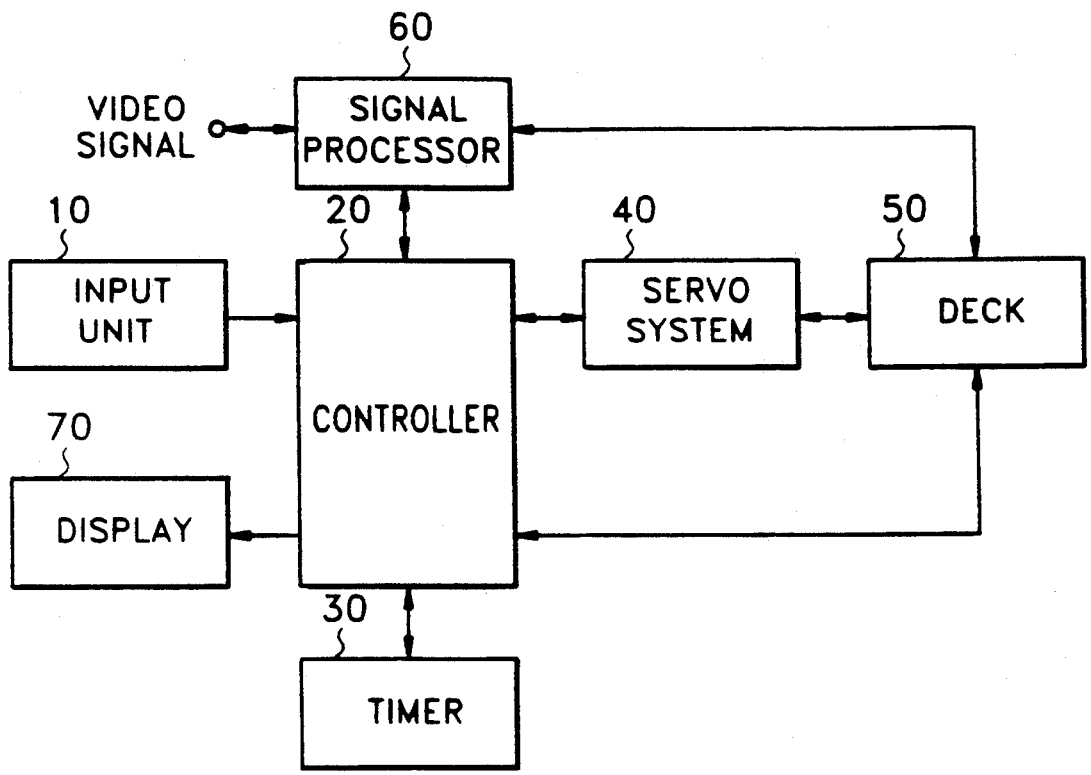
FIG. 1 is a block diagram of a conventional video cassette recorder.
Figure 2:
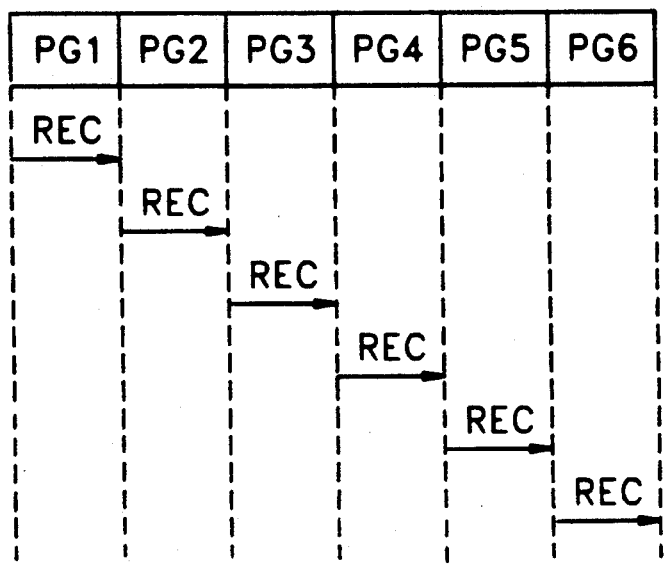
FIG. 2 illustrates a conventional recording method for reserved programs.
Figure 5:
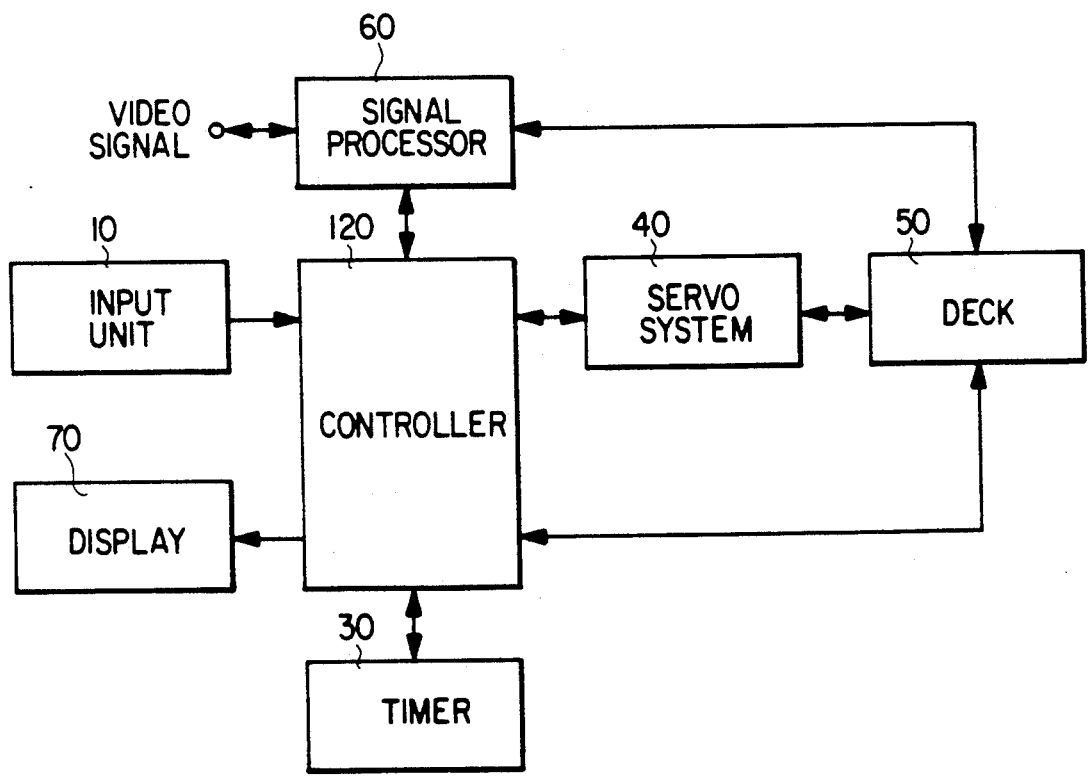
FIG. 5 is a video and block diagram of a cassette recorder according to a preferred embodiment of the invention.

Except for controller 120, which is preferably a microprocessor-based device, the construction of the VCR system for performing the present invention is similar to that shown in FIG. 1 and is illustrated in FIG. 5.

To begin with, the viewer selects programs, which will be reserved for recording, and inputs reserve information about the selected programs. The input information includes time information, channel information, a tape mode during recording, a block number (BLK) for each program and any other relevant information. The tape mode designates the recording mode to be for standard play (SP) or extended play (EP), and the block number is a number corresponding to the content, or subject matter, of individual programs. By repeating the foregoing process for each program to be recorded by the program reservation function, all the programs are then classified according to the content thereof. The reservation information is input through a keypad, or the like, associated with input (unit 10. Then, controller 120 receives the reservation information from input unit 10, and allocates addresses therefor in the internal memory area, thereby storing the information corresponding to the reserved programs in these addresses. Here, the information received during the reserve process of the programs is assumed as shown in Table 1.

TABLE 1

| program | reserved time | block number | content |
|---------|---------------|--------------|---------|
| PG1 | 9:00–10:00 | BLK1 | sports |
| PG2 | 11:00–11:30 | BLK2 | news |
| PG3 | 12:00–13:00 | BLK3 | drama |
| PG4 | 14:00–15:00 | BLK1 | sports |
| PG5 | 16:00–17:00 | BLK2 | news |
| PG6 | 18:00–19:00 | BLK3 | drama |

After reserving the programs according to their contents as described above, the process for recording the reserved programs, according to the content, in the pre-programmed chronological order, will be described below with reference to FIG. 3.

First, controller downloads the current time from a timer 30 and compares the downloaded time with each pre-programmed time of the programs stored in the internal memory (step 301). Then, the earliest pre-programmed time among the reserved programs is checked so as to determine whether the current time has reached a recording time thereof (step 302). Here, if the current time is not that of a reserved program, the program returns step 301 to await the time of the earliest reserved program.

When the current time received from timer 30 reaches the recording time of the initially reserved program in step 302, the channel is tuned to the selected channel of the corresponding reserved program, servo system 40 and deck 50 are set to the corresponding recording mode, and the initially reserved program is recorded (step 303). The video signal is supplied to the video head of deck 50 through the recording section of signal processor 60. At this time, as shown in the Table 1, the earliest recorded program is PG1, and step 303 carries out recording for one hour.

After recording the initial program, whose pre-programmed fi me is the earliest among the reserved programs, controller 120 confirms whether or not another program having the same block number exists among the reserved programs which are stored in the internal memory. Then, if one or more reserved programs of the same block number do exist, the earliest of these are selected and this program is compared with a program whose reserved time is the earliest among the reserved programs having block numbers different from that of the earliest program, which are designated in the internal memory (step 304). In particular, the pre-programmed time of the earliest reserved program having the same block number is checked so as to determine whether it precedes that of the earliest program having one of the other block numbers (step 305). If the pre-programmed time of the program having the same block number is earlier than the earliest program of the other block numbers, the next reserved program in that block is recorded at the appropriate time (step 306). When the step 306 recording is completed, the program returns to step 304.

In step 305, if the pre-programmed time of the next reserved program of the same block is later than that of the earliest reserved program of the other block numbers (or if no other reserved program exists for the same block number), the time required for advancing to the recording position of reserved programs having other block numbers is calculated. Servo system 40 then operates deck 50 in the fast-forward (FF) mode for the calculated time, and stops deck 50 at the recording position of the corresponding reserved program which has the next chronological pre-programmed time (step 307). Here, the duration of the FF operation corresponds to the total recording time of programs reserved for the section of the tape corresponding to the correct block number. Then, the existence of another reserved program having the same block number is checked. If another reserved program having the same block number exists, the program returns to step 305 and repeats steps 305 to 307 (step 308).

In other words, after program PG1 is recorded, since the next reserved program (in chronological order) having the same block number (BLKI) is PG4, controller 120 checks the pre-programmed time of program PG4 of block BLKI and the pre-programmed time of the remaining reserved programs (PG2, PG3, PG5, and PG6) of the other block numbers (BLK2 and BLK3) in step 305.

At this time, since the pre-programmed time of program PG2, having block number BLK2, is earlier than that of the next program PG4 of the already-recorded block number, BLKI (step 305), the FF function is performed from the end position of currently recorded program PG1 to the starting position for program PG2, passing over a reserved interval corresponding to the length of program PG4 in step 306.

Also, in step 307, the shifting time is calculated using the output of an unshown capstan frequency generator (hereinafter referring to as a "CFG" while deck 50 is driven in the FF mode). That is, servo system 40 is composed of a capstan servo and drum servo, wherein the capstan servo controls the travelling speed of the tape. At this time, a CFG signal includes the rotational frequency of the capstan wheel, which is 1078.92Hz in the SP mode. Thus, controller 120 stores the pre-programmed time of each program in its internal memory, so that the rime of the next program having the same block number as the current program and which will be recorded on the same portion of the tape next is calculated while performing the high-speed functions (FF or REW). Then, the CFG signal received through servo system 40 is counted while deck 50 is operated in the FF mode, thereby proceeding to the proper recording position of the next chronological program.

When it is determined in step 308 that there is no other reserved program having the same block number as the previously recorded reserved program, controller 120 receives current time information via timer 30, sets deck 50 to the recording mode, and controls servo system 40 to operate deck 50 in a normal speed mode, upon reaching the pre-programmed time of the next chronological reserved program (step 309).

In other words, considering Table I above, in step 309, after recording program PG1, the FF operation is carried out for the duration corresponding to the pre-programmed time interval of program PG4 which has the same block number (BLKI) as program PG1. Then, program PG2 whose pre-programmed time is the earliest among the remaining programs, having other block numbers (BLK2 and BLK3), is recorded.

After this, controller 120 checks for the existence of the next reserved program (step 310), compares the 6 me of the next program having the current block number (here, B1,K2) with the time of the programs having other block numbers (BLKI and BLK3), when a reserved program having the current block number exists (step 31 1), and checks whether or not the next program has a block number which corresponds to a program that already been recorded. If not, the program returns to step 305 (step 312).

Referring to Table 1, after recording program PG2 having block number BLK2 in step 309, the pre-programmed time of program PG5, having the same block number BLK2, is compared with each pre-programmed time of programs PG3, PG4, and PG6 having block numbers BLK1 and BLK3.

Here, since the pre-programmed time of program PG3 is earlier than that of program PG5, it is recognized that the next reserved program PG3 is not a program having a block number corresponding to already recorded programs in step 312, and the program returns to step 305. Accordingly, controller 120 repeats steps 305 through 309 to perform the FF operation for the duration corresponding to the pre-programmed time of program PG5, and thereafter records the content of program PG3 at its pre-programmed time.

After recording program PG3 having block number BLK3, when the pre-programmed rime of the other program PG6 having block number BLK3 is compared with those of programs PG4 and PG5 having block numbers BLKI and BLK2 respectively in step 311, it can be noted that the pre-programmed time of program PG4 is earlier than that of program PG6. Thus, in step 313, controller 120 calculates each program time wherein the reserved recording is already carried out as well as each reserved program time. Then, deck 50 is set to the REW mode and, through servo system 40, performs the rewind function to stop at the position of the corresponding reserved program. Thereafter, controller 120 receives the time information of timer 30, thereby recording the corresponding programs in step 309 at each pre-programmed rime thereof.

By repeating the reserve recording, when the last program is recorded, controller 120 recognizes the final recording in step 310 and controls servo system 40 to operate deck 50 in the REW mode, thereby rewinding to the initial program recording position and completing the program (step 314).

Figure 4A:
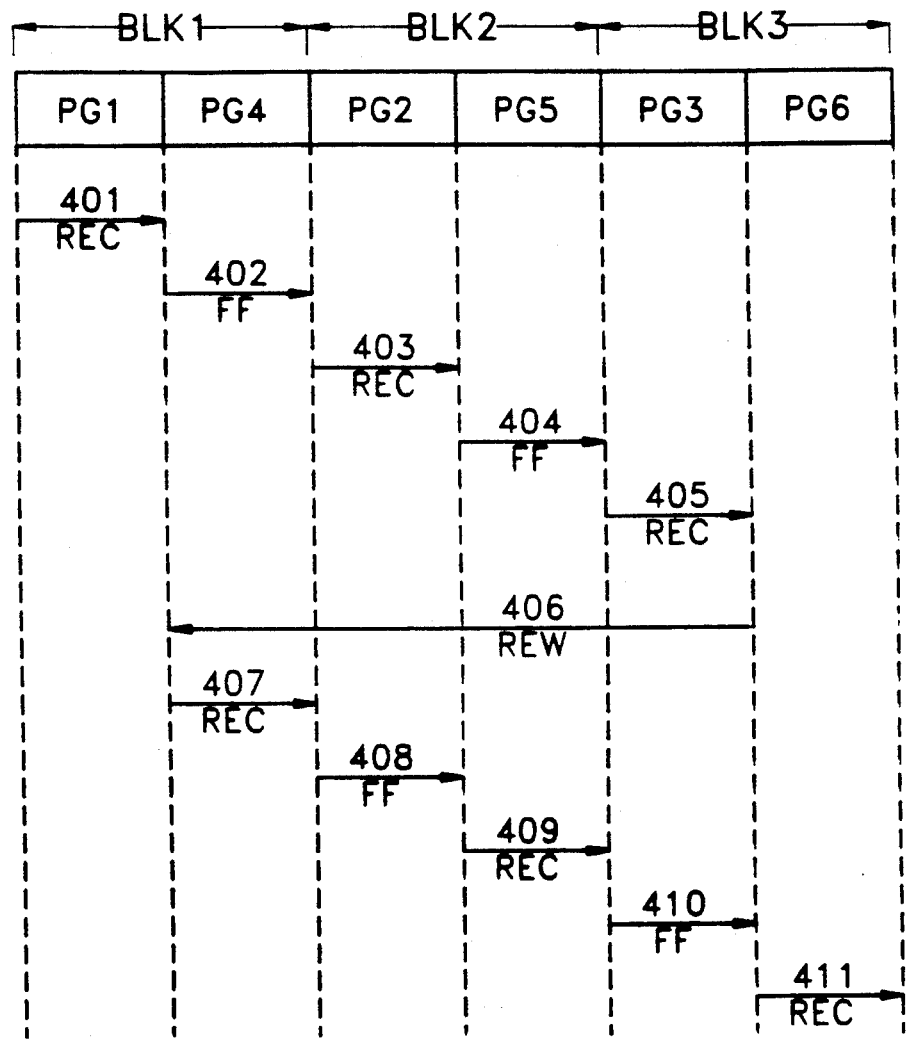
FIG. 4a illustrates the order of the reserved recording carried out according to the method of the present invention shown in FIG. 3 and corresponding to Table 1.

When the above-described process is carried out, after the programs are reserved based upon block numbers as shown in Table 1, the recording is performed based on the chronologically reserved order of each program, as illustrated in FIG. 4A. Meanwhile, it can be noted that the programs recorded are reproduced in sections of the tape corresponding to the block numbers thereof. That is, if controller 120 recognizes the pre-programmed time of program PG1 in step 302.., and program PG1 is recorded in step 303, and, since each pre-programmed time of programs PG2 and PG3 (having other block numbers) is earlier than that of program PG4 included in block BLK1 in step 304, the tape is transferred by performing a FF operation to reservation space so as to allow recording of program PG4 at a position directly following program PG1, which belongs to the same block, in step 307. Program PG3 is recorded in step 309, and the pre-programmed times of PG6, PG4, and PG5 are compared with one another in step 311.

Then, step 312 recognizes that the pre-programmed time of program PG4 is earlier than those of PG5 and PG6, and the REW function is performed until the preset position on the tape is reached, thereby recording program PG4 physically following program PG1 in step 313. After recording program PG4, a FF operation is performed throughout the recording section of program PG2, having block number BLK2, and program PG5, having block number BLK2 is recorded following program PG2. Then, the FF function is again performed throughout the recording section of program PG3, having block number BLK2, and program PG6, having block number BLK3 is recorded following program PG3. The order of operation of the preferred embodiment, corresponding to Table 1, is illustrated in FIG. 4A.

Figure 4B:
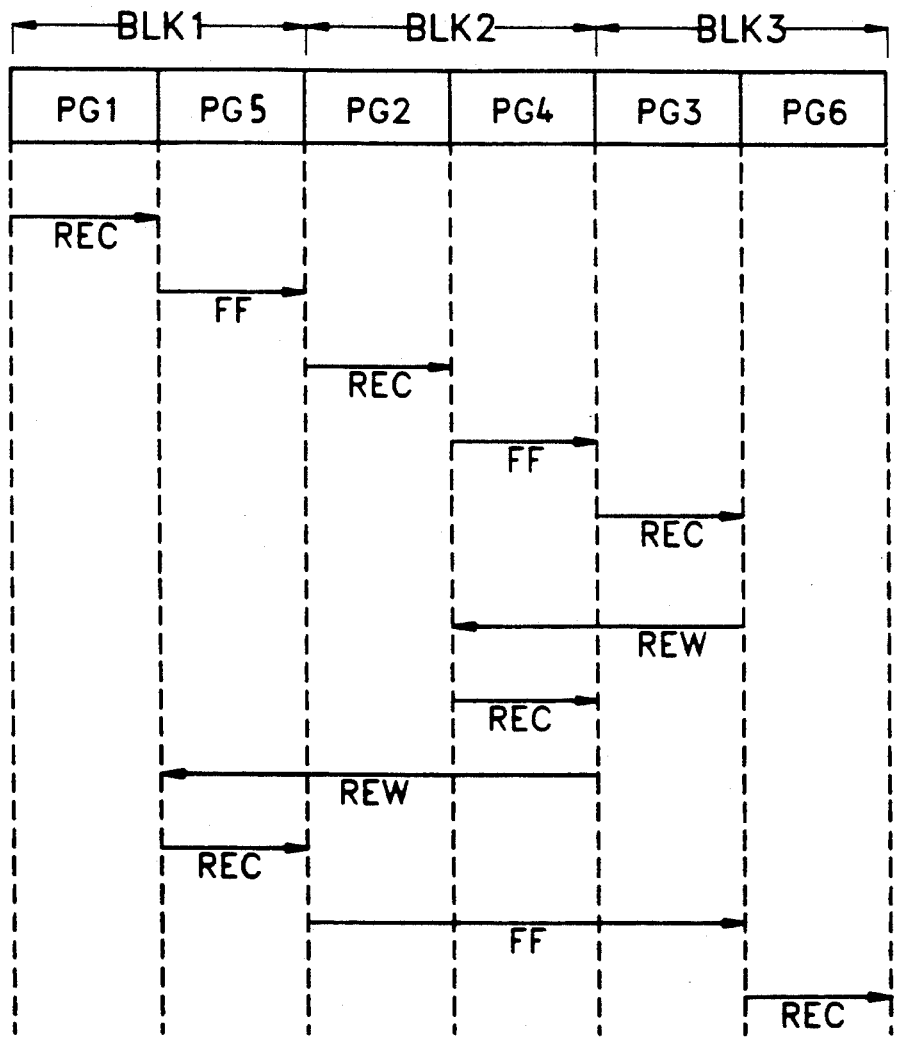
FIG. 4b illustrates another order of reserved recording.

FIG. 4B shows another example of the sequence of the reserved recording according to the present invention. In this sequence PG5 is in block 1 and PG4 is in block 2.

In this sequence, when controller 120 recognizes the pre-programmed time of program PG1 in step 302, program PG1 is recorded in step 303, and, since the pre-programmed time of program PG5, having block number BLKI, is later than those having other block numbers, Programs PG2, PG3, and PG4 in step 304, the tape is transferred by performing a FF operation to allow program PG5 to be recorded at a position following program PG1 in step 307. Program PG3 is recorded in step 309, and the pre-programmed times of programs PG6, PG5, and PG4 are compared with one another in step 311.

In step 312, it is recognized that the pre-programmed time of program PG5 is the earliest of the remaining programs, and the section of the tape where a position has already been reserved is reached by a rewinding operation in step 313, so that program PG5 is recorded at a position following program PG1. After recording PG5, the recording section of PG2 is passed by carrying out a FF operation, and program PG4 having block number BLK2 is recorded at a position following program PG2. Then, the recording section of program PG3 is passed by carrying out another FF operation, so that program PG6 having block number BLK3 is recorded following program PG3.

In the reserved recording method and apparatus according to the present invention as described above, the programs are recorded based upon the preset reserved order in a video recording/reproducing apparatus, since the locations of respective programs recording on the tape are linked based upon their contents, the recorded programs having a desired content can be easily selected for viewing during playback.

It should, that the preferred embodiment is a VCR utilizing tape as a recording medium. However, the present invention applies to any recording device utilizing any recording media. Also, various other modifications can be made to the preferred embodiment without departing from the scope of the invention as defined by the appended claims.

What is claimed is:

1. A reserved recording method in a recording/reproducing apparatus wherein reservation data which includes time information, relating to the times of programs to be recorded on a recording medium, and block numbers which represent the contents of said programs, are inputted for each of said programs, said reservation data being stored in an internal memory, said method comprising the steps of:
   receiving current time information, and recording a current program of said programs whose pre-programmed time is the earliest among said programs;
   comparing the time information of a next program of said programs having the same block number as said current program with time information of said programs having other block numbers to determine if said next program is the earliest of said programs;
   waiting until reaching time corresponding to the time information of said next program when said time information of said next program having the same block number as said current program is the earliest among those of said programs having other block numbers, recording said next program, and repeating said comparing step;
   calculating a length of a reserved section of said recording medium to be reserved for recording said next program when time information of a corresponding program of said programs having another block number is earlier than that of said next program, and shifting to the recording position of said corresponding program by advancing said recording medium through a fast forward function for a period of time corresponding to a duration of said reserved section;
   recording said corresponding program in another section of said recording medium which corresponds to the block number of said corresponding program;
   analyzing each pre-programmed time of said next program having the same block number as said corresponding program recording in said recording step and said programs having other block numbers to determine if said next program is the earliest of said programs;
   repeating said comparing step when a program having the earliest time information as determined in said analyzing step does not have the same block number as said corresponding program recorded in said recording step; and
   performing a rewind function for a duration corresponding to sections of said recording medium where said recording and said fast forward operations have already been carried out, when the time information of said next program is earlier than that of said programs having other block numbers, and then performing said recording step of said corresponding program.

2. A reserved recording method as claimed in claim 1, wherein, in said calculating step, the rotational frequency signal of a capstan wheel is counted until reaching the starting point of the recording of said corresponding program when the time information of said corresponding program having another block number is earlier than that of said next 3. A reserved recording method as claimed in claim 1, wherein, in said performing step, said duration corresponds to said sections where said recording and said fast forward operations have already been carried out, and is calculated by counting the pulses of a control signal having a predetermined frequency, said control signal being representative of movement of said recording medium.

4. A reserved recording method in a video recording/reproducing apparatus comprising the steps of:
   receiving a pre-programmed time and block number, which represents contents of programs, for each program to be recorded on a recording medium and storing said times and block numbers;
   receiving current time information from a timer, and checking said pre-programmed times of said programs;
   recording one of said programs corresponding to said current time when said current time is the pre-programmed time of said one of said programs;
   checking for the existence of another program having the same block number as said one of said programs;
   comparing the pre-programmed time of other programs having other block numbers with said another program, when said another program having the same block number exists in said checking step;
   proceeding to said recording step after recording said another program, when the pre-programmed time of said program having the same block number is the earliest among other programs having other block numbers in said comparing step;
   performing a fast forward function through a recording section of said recording medium corresponding to said another program having the same block number, and shifting to a position of said recording medium corresponding to a next of said programs having another block number, and proceeding to said recording step, when the pre-programmed time of a next of said programs having another block number is earlier than that of said another program having the same block number in said comparing step;

reading time information of the earliest of said programs having another block number when there is no reserved program having the same block number in said checking step; and moving to the recording position of said next of said programs by performing a fast forward function, and proceeding to said recording step.

5. A reserved recording method as claimed in claim 4, wherein said shifting step comprises the steps of:

checking whether or not the next of said programs has a block number corresponding to a program which has already been recorded;

shifting to the recording position of said next program by performing a fast forward operation, when said block number of said next program does not have a block number corresponding to a program which has already been recorded; and shifting to the recording position of said next program by performing a rewind operation, when said next program has a block number corresponding to a program which has already been recorded.

6. A reserved recording method as claimed in claim 4, wherein, in said performing step, said position of said recording medium is located by counting the rotational frequency signal of a capstan wheel in said recording section, when the pre-programmed time of said next program having another block number is earlier than said another program having the same block number.

7. A reserved recording method as claimed in claim 5, wherein, in said shifting step, said recording position of said next program is calculated by counting the pulses of a control signal having a predetermined frequency, said control signal being representative of movement of said recording medium.

8. A reserved recording method in a recording/reproducing apparatus, the apparatus including a recording/reproducing device for recording a plurality of different programs on a recording medium, and for reproducing the recorded programs, an input device for inputting time information representing a time when each of the plurality of programs is to be recorded, and for inputting content information representing a content of each of the programs, and a memory for storing the inputted time and content information, the method comprising the steps of:

inputting time and content information for a plurality of programs to be recorded;

storing the inputted time and content information;

determining, from the stored time information, a sequence in which the plurality of programs are to be recorded, and determining, from the stored content information, a plurality of different groups for the plurality of programs; and recording the plurality of programs according to the determined sequence at locations on the recording medium such that during reproduction of the recorded programs from the recording medium, programs within a same determined group are consecutively reproduced;

wherein the plurality of programs to be recorded on the recording medium includes a first program, a second program and a third program, the first program has a first time information, the second program has a second time information which is later than the first time information, and the third program has a third time information which is later than the second time information, wherein said determining step determines that the first and third programs are of a first group, and the second program is of a second group which is different from the first group, and wherein said recording step includes recording the first program, performing, after the first program is recorded, a first shifting operation for shifting a present recording location on the recording medium, and recording, after the shifting operation is performed, the second program, said shifting operation is a fast forward operation which is performed for a period of a time not less than a time duration corresponding to the third program.

9. A reserved recording method in a recording/reproducing apparatus, the apparatus including a recording/reproducing device for recording a plurality of different programs on a recording medium, and for reproducing the recorded programs, an input device for inputting time information representing a time when each of the plurality of programs is to be recorded, and for inputting content information representing a content of each of the programs, and a memory for storing the inputted time and content information, the method comprising the steps of:

inputting time and content information for a plurality of programs to be recorded;

storing the inputted time and content information;

determining, from the stored time information, a sequence in which the plurality of programs are to be recorded, and determining, from the stored content information, a plurality of different groups for the plurality of programs; and recording the plurality of programs according to the determined sequence at locations on the recording medium such that during reproduction of the recorded programs from the recording medium, programs within a same determined group are consecutively reproduced;

wherein the plurality of programs to be recorded on the recording medium includes a first program, a second program and a third program, the first program has a first time information, the second program has a second time information which is later than the first time information, and the third program has a third time information which is later than the second time information, wherein said determining step determines that the first and third programs are of a first group, and the second program is of a second group which is different from the first group, and wherein said recording step includes recording the first program, performing, after the first program is recorded, a first shifting operation for shifting a present recording location on the recording medium, and recording, after the shifting operation is performed, the second program; and performing a second shifting operation, after the second program is recorded, for shifting the present recording location of the recording medium, and recording the third program on the recording medium after the second shifting operation, said second shifting operation being a rewind operation which is performed for a period of time not less than a sum of a time duration corresponding to the second program and a time duration corresponding to the third program.

10. A reserved recording method in a recording/reproducing apparatus, the apparatus including a recording/reproducing device for recording a plurality of different programs on a recording medium, and for reproducing the recorded programs, an input device for inputting time information representing a time when each of the plurality of programs is to be recorded, and for inputting content information representing a content of each of the programs, and a memory for storing the inputted time and content information, the plurality of programs to be recorded on the recording medium includes a first program, a second program and a third program, the first program has a first time information, the second program has a second time information which is later than the first time information, and the third program has a third time information which is later than the second time information, the method comprising the steps of:

inputting time and content information for a plurality of programs to be recorded;

storing the inputted time and content information;

determining, from the stored time information, a sequence in which the plurality of programs are to be recorded, and determining, from the stored content information, a plurality of different groups for the plurality of programs;

recording the plurality of programs according to the determined sequence at locations on the recording medium such that during reproduction of the recorded programs from the recording medium, programs within a same on of the plurality of groups are consecutively reproduced on the recording medium; and said determining step determines that the first and third programs are of a first group, and the second program is of a second group which is different from the first group, and wherein said recording step includes recording the first program, performing, after the first program is recorded, a first shifting operation for shifting a present recording location on the recording medium from a first position to a second position through an amount of the recording medium required for recording the third program, and recording, after the shifting operation is performed, the second program.

11. The method as defined in claim 10, wherein said recording step further includes performing a second shifting operation, after the second program is recorded, for shifting the present recording location of the recording medium to said first position, and recording the third program on the recording medium after the second shifting operation.

* * * * *